Jan. 23, 1923.

L. LEE.
POWER TRANSMISSION DEVICE.
FILED AUG. 30, 1920.

1,443,026.

Inventor
Leif Lee
By Bakewell, Byrnes & Parmelee
his Attorneys

Patented Jan. 23, 1923.

1,443,026

UNITED STATES PATENT OFFICE.

LEIF LEE, OF YOUNGSTOWN, OHIO.

POWER-TRANSMISSION DEVICE.

Application filed August 30, 1920. Serial No. 406,945.

*To all whom it may concern:*

Be it known that I, LEIF LEE, a citizen of the United States, residing at Youngstown, Mahoning County, Ohio, have invented a new and useful Improvement in Power-Transmission Devices, of which the following is a full, clear, and exact description.

The present invention relates broadly to power transmission devices, and more particularly to devices of this nature adapted to slip when the load is increased beyond a predetermined maximum.

It has heretofore been proposed to construct power transmission devices adapted to frictionally transmit power, and comprising driving and driven members having frictional interengaging means. The present invention relates to a construction of this general nature, and provides an easily adjustable means for regulating the point of slip, and controlling springs of maximum length and efficiency. The entire construction is such that the operating parts may run in an oil bath thereby greatly increasing the life of the device.

The foregoing and other objects, together with their attendant advantages, will be apparent as the invention becomes better understood, by reference to the accompanying specification and drawings forming a part thereof, it being premised that changes may be made in the various details and the manner of operation, within the scope of the appended claims, without departing from the spirit of the invention.

Figure 1:
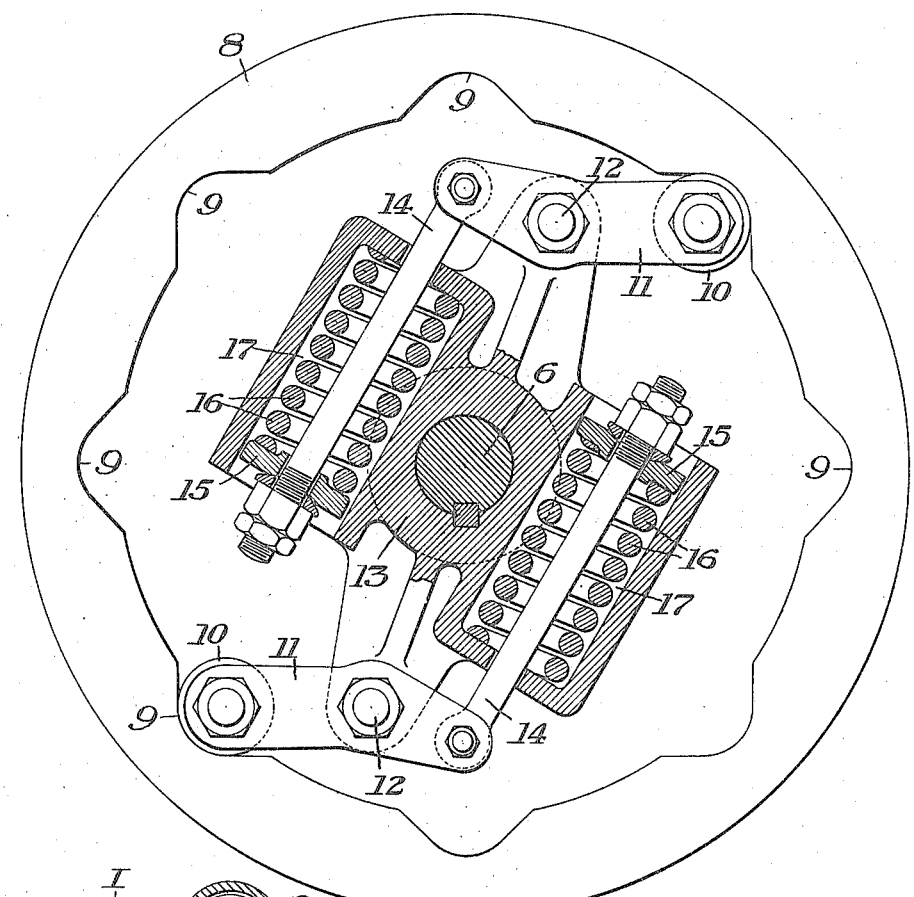
Figure 2:
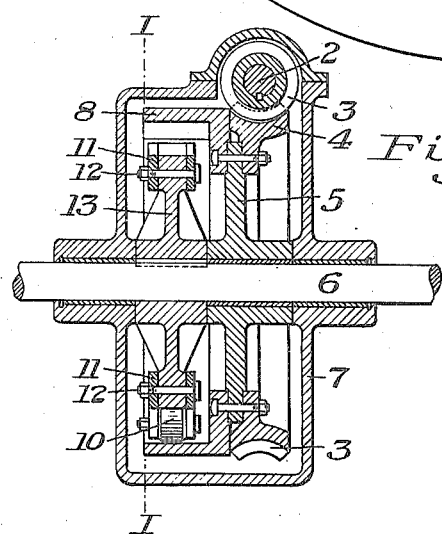

Figure 1 is a partial sectional view on the line I—I of Figure 2, the housing being omitted, and Figure 2 is a sectional view illustrating one method of assembling the driving and driven members.

Referring more particularly to the drawings, there is illustrated a power transmission device comprising a driving shaft 2 having a worm 3 thereon in engagement with a worm wheel 4. In the present embodiment, the worm wheel is illustrated as comprising a ring gear suitably secured to a hub 5 freely rotatable on the driven shaft 6 within a conventional housing 7 of any usual construction.

Also secured to the hub 5 is an annular flanged member 8, constituting a driver, and provided with a series of equally spaced curved grooves 9 in the inner face thereof, the number and construction of which may be varied as desired. Adapted to engage diametrically opposite grooves 9 are rollers 10 rotatably carried by the ends of levers 11 having fulcrums 12 on a hub 13 which is splined to the driven shaft 6. The opposite ends of each of the levers 11 have secured thereto tension rods 14 having their free ends threaded to adjustably support follower heads 15 engaging compression springs 16 suitably mounted in pockets or cylinders 17 formed in the hub 13. By adjusting the position of the heads 15 longitudinally of the tension rods 14 by means of the nuts provided, it will be apparent that the frictional engagement between the rollers 10 and the inner face of the flanged member 8 having the radiused grooves 9 may be increased or decreased as desired. With the springs 16 slightly compressed, a comparatively light load on the shaft 6 may be sufficient to cause the rollers 10 to ride out of the grooves 9 against the force exerted by the springs. This will result in slipping between the driving and driven members, the slipping continuing until the load is decreased sufficiently to permit re-engagement of the rollers with the nearest grooves 9. By increasing the compression of the spring 16, the opposition to slipping will be increased proportionately, thereby enabling the transmission of any desired torque below a predetermined maximum.

If desired, the entire housing 7 may be filled with oil to insure ease of operation of the slip gear. The provision of the rollers 10 decreases friction during the periods of slipping whereby the maintenance cost is decreased and the length of life of the device increased. Due to the location of the grooves 9, it will be obvious that driving engagement will be automatically re-established substantially simultaneously with the decrease in the load, while the opposed points of engagement balance the force exerted by the respective springs.

It will be apparent that the present invention is adaptable for use in any construction requiring a flexible coupling between relatively movable members, and the term "power transmission device" as used throughout the specification and claims is to be construed broadly enough to be definitive of such a use.

The advantages of the present invention arise from the provision of a power transmission device adapted to slip under conditions which may be changed easily as required.

I claim:

1. A power transmission device, comprising a rotary member having a series of grooves formed therein, a second rotary member having a pocket formed therein, a lever pivotally carried by said second member, a roller on one end of said lever adapted to cooperate with said grooves, a spring in said pocket and means cooperatively connecting said spring and the opposite end of said lever to exert a yielding pressure on said roller, substantially as described.

2. In a power transmitting device, a driving member, a driven member, one of said members having a pivotally mounted lever with a roller carried by one end thereof, the other of said members having an irregular bearing surface adapted to be engaged by said roller, a tension rod secured to the opposite end of said lever, and a compression spring surrounding said rod for holding the roller in engagement with said bearing surface, substantially as described.

3. In a power transmitting device, a driving member, a driven member, one of said members having a pivotally mounted lever with a roller carried by one end thereof, the other of said members having an irregular bearing surface adapted to be engaged by said roller, a tension rod secured to the opposite end of said lever, a compression spring surrounding said rod for holding the roller in engagement with said bearing surface, and means on said tension rod for varying the force exerted by said spring, substantially as described.

4. In a power transmission device, a flanged rotary member having a series of grooves formed in the inner surface of the flange, a second rotary member, at least a part of which lies within said flange, a plurality of levers pivotally mounted on said second member, a roller carried by one end of each of said levers for engagement with said grooves, a tension rod secured to the opposite end of each of said levers, and compression springs surrounding said rods for maintaining the rollers in engagement with said grooves, substantially as described.

5. In a power transmission device, a flanged rotary member having a series of grooves formed in the inner surface of the flange, a second rotary member, at least a part of which lies within said flange, a plurality of levers pivotally mounted on said second member, a roller carried by one end of each of said levers for engagement with said grooves, a tension rod secured to the opposite end of each of said levers, compression springs surrounding said rods for maintaining the rollers in engagement with said grooves, and means on said rods for varying the force exerted by said springs, substantially as described.

6. In a power transmission device, a rotary member having a series of grooves formed therein, a second rotary member, a plurality of levers pivotally mounted on diametrically opposite sides of said second member, a roller carried by one end of each of said levers for engagement with said grooves, and springs extending across the axis of rotation of said second member and cooperating with the opposite ends of said levers for maintaining the rollers in engagement with the grooves, substantially as described.

7. In a power transmission device, a rotary member having a series of grooves formed therein, a second member having a plurality of oppositely extending pockets formed therein, a plurality of levers pivotally carried by said second member, a roller on one end of each of said levers adapted to cooperate with said grooves, tension rods secured to said levers and extending into said pockets, and springs in said pockets and surrounding said rods for exerting a yielding pressure on the rollers, substantially as described.

8. In a power transmission device, a rotary member having a series of grooves formed therein, a second member having a plurality of oppositely extending pockets formed therein, a plurality of levers pivotally carried by said second member, a roller on one end of each of said levers adapted to cooperate with said grooves, tension rods secured to said levers and extending into said pockets, springs in said pockets and surrounding said rods for exerting a yielding pressure on the rollers, and an oil receiving casing operatively enclosing said members, substantially as described.

In testimony whereof, I have hereunto set my hand.

LEIF LEE.